United States Patent [19]

Oare et al.

[11] 4,266,954
[45] May 12, 1981

[54] HOLDER FOR BAG FILTER

[75] Inventors: Arthur A. Oare; Harold J. Wonderling, both of Wellsville, N.Y.

[73] Assignee: The Air Preheater Company, Inc., Wellsville, N.Y.

[21] Appl. No.: 56,758

[22] Filed: Jul. 12, 1979

[51] Int. Cl.³ .............................................. B01D 46/02
[52] U.S. Cl. .................................. 55/341 R; 55/302; 55/377; 55/379
[58] Field of Search ..................... 55/379, 302, 341 R, 55/377

[56] References Cited

U.S. PATENT DOCUMENTS

| 3,876,402 | 4/1975 | Bundy et al. | 55/379 X |
|---|---|---|---|
| 3,997,305 | 12/1976 | Ulvestad et al. | 55/341 R |
| 4,042,356 | 8/1977 | Miller | 55/379 X |
| 4,157,901 | 6/1979 | Schaltenbrand | 55/379 X |

FOREIGN PATENT DOCUMENTS 53617   6/1946   France ........................................ 55/379

Primary Examiner—Kathleen J. Prunner
Attorney, Agent, or Firm—Wayne H. Lang

[57] ABSTRACT

A bag filter assembly adapted to permit rapid removal, replacement and repair of the individual filter bags in the assembly. The filter bags are frictionally held in an operational position by a combination of interlocking parts that are securely held by spring biased detents. The spring biased detents of the several parts are designed to permit assembly and disassembly of the bag filter by a series of direct push-pull movements.

1 Claim, 3 Drawing Figures

HOLDER FOR BAG FILTER

BACKGROUND OF THE INVENTION

1. Field of the Invention

This invention relates to bag filter apparatus that is adapted to receive particulate laden gas and permit only clean gas to pass therethrough while the particulates thereof are retained by the filter apparatus. A complete bag filter apparatus usually comprises an assembly having a plurality of gas pervious bags depending from an apertured tube sheet, each bag being clamped to a wire frame or cage of transverse circular bands having longitudinal rods bonded thereto at their points of contact.

Inasmuch as a complete bag filter assembly may incorporate a total of from 100 to 200 bags and each bag is itself a complex assembly of interlocking elements, the removal, repair and replacement of bags may constitute a major economic factor in the long range cost of a bag filter and its operation.

2. Description of the Prior Art

Numerous arrangements have been devised whereby filter bags may be secured to a tube sheet or other structure for support. In most known cases each filter bag is independently secured to a support cage by a complex arrangement of clamping rings, threaded bolts and the like shown by U.S. Pat. Nos. 3,568,992, 3,568,415, 3,874,859, or 3,538,687. Frequently, also the structural support for an array of filter bags is accessible only from within that portion of a housing that is continuously surrounded by a quantity of dirty inlet air, thus requiring a complete shutdown of the unit before workmen may enter an essentially clean housing. Obviously, maintenance and repair of a conventional bag filter is a slow, tedious job that is usually performed under less than ideal conditions.

SUMMARY OF THE INVENTION

This invention therefore has as its chief objective the provision of a bag filter assembly that may quickly and effectively be assembled or disassembled by a simple arrangement of independent elements that are held in place by a unique system of interlocking, spring biased detents. This arrangement effectively replaces the usual screw tightened clamping rings and holding bolts, and it permits maintenance and repair of the unit in a clean air atmosphere.

DESCRIPTION OF THE PREFERRED EMBODIMENT

Figure 1:
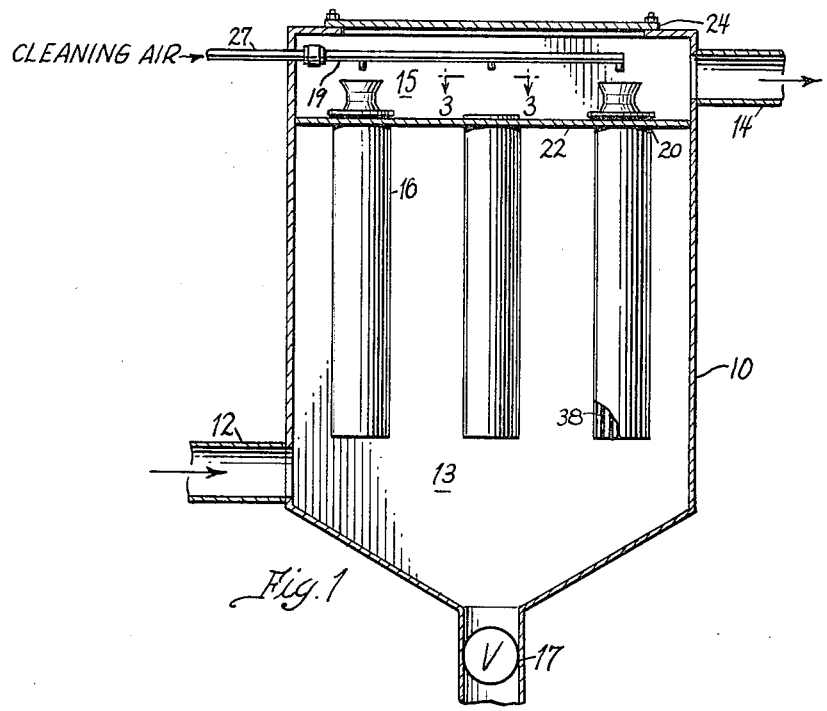
FIG. 1 is a vertical elevation of a bag filter arrangement constructed according to the present invention.

A housing 10 enclosing the filter assembly has an inlet 12 for dirty gas and an outlet 14 for gas that has been cleaned by passing through the fine openings or pores of a filter bag 16 lying therebetween. The filter bag 16 is supported from the spaced aperture 20 of a tube sheet 22 that separates the housing 10 into an inlet chamber 13 for dirty air and an outlet chamber 15 for clean air. Access openings with removable doors 24 permit entry into the clean air chamber to effect rapid replacement or repair of the filter bags that depend from the tube sheet 22 in the inlet chamber 13, while a cleanout valve 17 at the bottom of the unit permits the removal of the collected dust from the housing 10.

This invention is adapted to be used in conjunction with a venturi casting shown generally at 21. This casting includes a venturi portion 23 that projects above the tube sheet 22 to receive a blast of compressed air from an air discharge nozzle and manifold 19 that is supplied by a duct 27 connected to a suitable source of compressed air. The cleaning air passes from the venturi portion down through a throat and a diffuser to a bag holding portion 25 that extends into the open end of the filter bag. From thence it is passed outwardly through the pores of the filter bag causing the packed dust particles or "cake" on the outer surface thereof to break away and fall to the hopper at the bottom of housing 10. Removal of residual dust through cleanout valve 17 is effected as required.

The bag holding portion 25 depending below the tube sheet 22 into the open end of a bag 16 provides means by which each bag is tightly held in the tube sheet. Conversely, the bag holding portion 25 has a detent portion that interlocks with other filter structure to hold the bag holding portion of the venturi tightly in the filter bag.

Figures 2, 3:
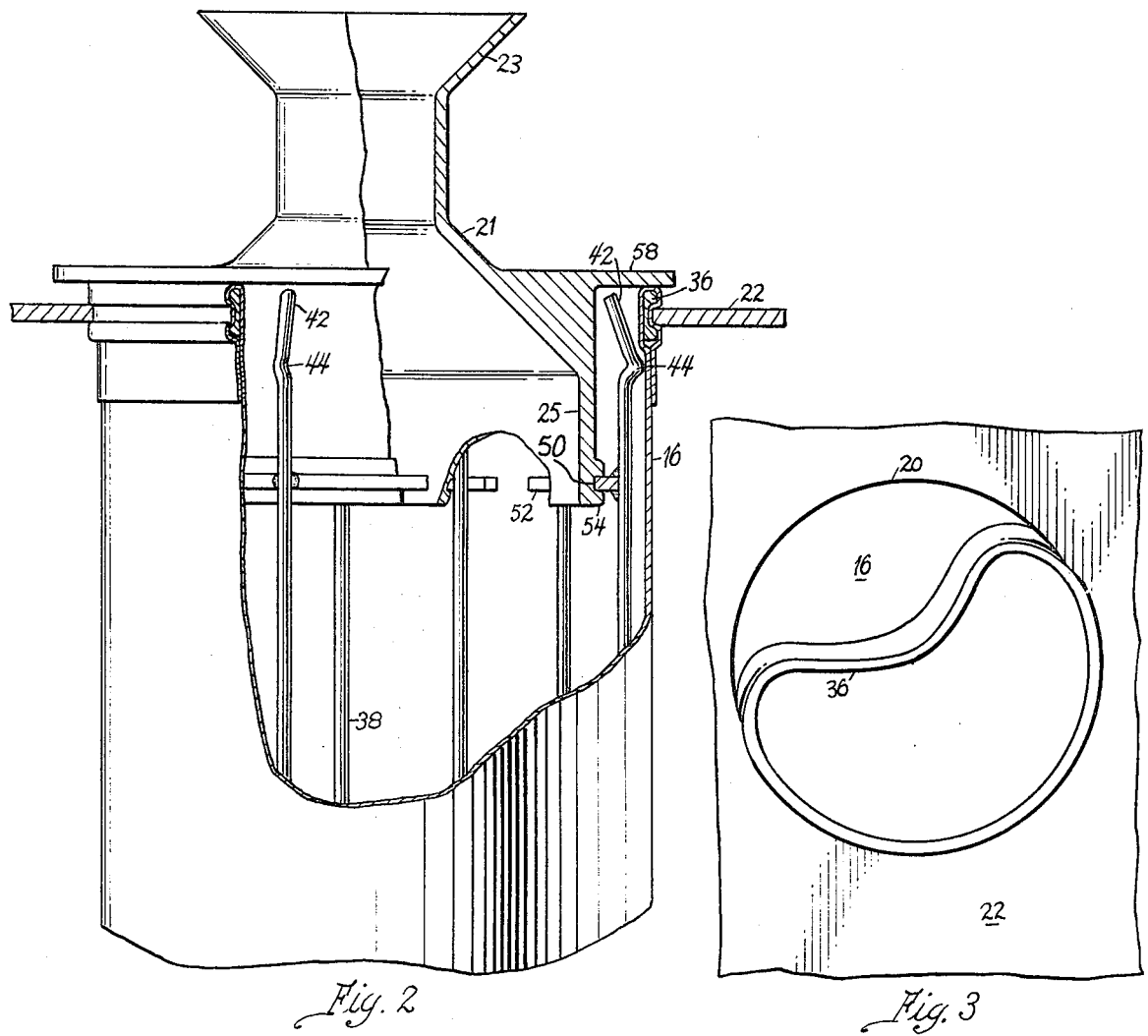
FIG. 2 is an enlarged section showing the details of construction of a single filter bag.
FIG. 3 is a schematic drawing showing lateral deformation of the pressure member that is required for bag removal.

In accordance with this invention, a filter bag 16 having a closed end and an open end is formed with a diameter substantially the same as that of an aperture 20 whereby the bag will fit snugly through a surrounding aperture. The annularly free edge of the filter bag is cuffed to form a loop that receives a laterally flexible annular spring band 36. The spring band 36 has an annular groove that is adapted to fit tightly within an aperture 20 of the tube sheet. However, the spring band 36 and surrounding open end of bag 16 may be laterally collapsed to decrease the size of the open end of the bag as shown schematically in FIG. 3 of the drawing. When so collapsed, the groove is released from the annular periphery of the surrounding tube sheet, and the entire bag assembly may then be withdrawn from the tube sheet to be repaired or replaced as necessary.

To completely support each bag in substantially cylindrical form, a skeletal frame or cage 38 of longitudinal wires and transverse wire bracing is adapted to fit within each bag 16. The lower end of each cage 38 is sized to freely traverse a circular opening in the tube sheet and the annular band 36, while the upper end thereof is formed to include prong-like extensions 42 that are adapted to place an outward bias on the inner surface of band 36, thus forcing it radially outward against the upper end of the bag filter and the periphery of the surrounding aperture. Each projection 42 is formed with a curved portion 44 that curves radially outward to form a detent that must be moved radially inward to permit the cage to pass axially through annular band 36.

A broken snap ring 52 normal to the longitudinal wires of cage 38 is spaced from the end of the cage and is welded thereto to support each longitudinal extension 42 as a cantilever type spring with an outward bias against annular band 36 when the cage is being inserted into the open end of a bag. Thus the curved detent 44 holds the cage within the tube sheet.

The wire ring 52 is positioned at a point on cage 38 that permits a rounded projection 54 at the bottom of the venturi 21 to form the lower surface of a groove that receives the snap ring 52 when the bag holding portion of the venturi is inserted into the open end of the bag as determined by the lateral flange 58 pressing against the end edge of the filter.

While the precise procedure for assembling or disassembling a bag filter assembly is not deemed critical, a complete bag removal and replacement operation may be effected in a minimum of time by utilizing essentially a series of push-pull operations. Thus after removal of the access door 24 and manifold 19, the entire bag assembly may be replaced or repaired as necessary. The first step of a disassembling procedure will require the removal of the venturi 21 by a simple vertical "pull" that removes the snap ring 52 from the groove above projection 54. Removal of the venturi 21 removes the outward bias on extensions 42 and the detent 44. Thus cage 38 may be readily removed and bag 16 including annular band 36 may be deformed and moved laterally away from the periphery of each aperture of the tube sheet in the manner shown by FIG. 3 of the drawing. The entire bag is then lifted longitudinally along the filter housing and repaired or replaced as required. Assembling a unit requires a generally opposite procedure in that a filter bag is usually snapped into place in the tube sheet with only the annular band 36 bearing the temporary responsibility of holding it in position. A venturi 21 is then inserted into the open end of a cage 38 until ring 52 falls into the groove 50 above projection 54. The entire cage assembly is then inserted into the open end of a bag unit until detent 44 clears the inner surface of annular band 36 to thus bias the extension 42 and ring 52 tightly into the groove 50, holding the venturi against any axial displacement.

What is claimed is:

1. Apparatus for filtering solids from gas comprising a housing having an inlet for dust bearing carrier gas and an outlet for gas from which dust has been removed, a tube sheet with a plurality of apertures therein extending across the housing intermediate the inlet and outlet to provide an inlet compartment for dirty gas and an outlet compartment for clean gas, a plurality of flexible bands, each of said bands having a groove in the outer surface thereof adapted to engage the periphery of an aperture of the tube sheet when the band is in an annular condition, a plurality of tubular filter bags depending from the tube sheet, each of said bags having an open end lying concentrically between one of the flexible bands and the periphery of one of the apertures in the tube sheet and a closed end extending into the inlet compartment for dirty gas, cage means adapted to support each filter bag and simultaneously bias each flexible band outward against the open end of each filter bag and the surrounding periphery of each aperture in the tube sheet, and means carried by the open end of each filter bag, said last named means having a venturi portion that extends above the tube sheet and a holding portion that extends into an open end of the cage means.

* * * * *